United States Patent [19]
Wang

[11] Patent Number: 5,805,887
[45] Date of Patent: Sep. 8, 1998

[54] UNIVERSAL POINTER OBJECT

[75] Inventor: I-Shin Andy Wang, San Jose, Calif.

[73] Assignee: International Business Machines Corporation, Armonk, N.Y.

[21] Appl. No.: 655,880

[22] Filed: May 31, 1996

[51] Int. Cl.$^6$ ................................................... G06F 9/44
[52] U.S. Cl. ............................................................ 395/701
[58] Field of Search ............................................. 395/701

[56] References Cited

U.S. PATENT DOCUMENTS

| | | | |
|---|---|---|---|
| 5,297,284 | 3/1994 | Jones et al. ............................... | 395/705 |
| 5,581,765 | 12/1996 | Munroe et al. ........................... | 395/682 |
| 5,590,327 | 12/1996 | Biliris et al. .............................. | 395/670 |
| 5,692,183 | 11/1997 | Hapner et al. ........................... | 395/701 |

Primary Examiner—Emanuel Todd Voeltz
Assistant Examiner—John Q. Chavis
Attorney, Agent, or Firm—Merchant, Gould, Smith, Edell, Welter, & Schmidt

[57] ABSTRACT

The present invention discloses a method, apparatus, and article of manufacture for creating a universal pointer object capable of pointing to member functions having any type and belonging to any class creating. More specifically, the present invention provides a computer-implemented method for creating a universal pointer object having a first data member holding a pointer to a member function. To create and initialize the universal pointer object, a universal pointer object is first created in a memory of a computer. The member function is then stored in the first data member of the universal pointer object using the constructor function of the universal pointer class, wherein the member function pointer is stored in the first data member according to the type of the member function. To invoke the member function, the first data member is referenced through a member function of the universal pointer object.

30 Claims, 3 Drawing Sheets

1

UNIVERSAL POINTER OBJECT

BACKGROUND OF THE INVENTION

1. Field of the Invention

The present invention relates generally to pointers, and in particular, to universal pointer objects capable of pointing to member functions having any type and belonging to any class.

2. Description of Related Art

In C++ and other object-oriented programming languages, users or programmers can create classes which contain data members as well as a set of functions, typically referred to as member functions, for manipulating the data. Each instance of a class, i.e., an object, has its own set of the data members and member functions of its class.

Functions in general and member functions of an object may be called directly or by referencing a pointer. A pointer is a variable that contains an address as its value. A pointer may point to a function, in which case the pointer contains the address of the function in memory.

One common use of function pointers is with an engine that accesses a number of different functions. A typical engine may include a repetition structure, for example, a for or while structure, which repeatedly calls a function while a condition is true. To use such engines, pointers to each function are typically stored in an array of pointers to functions. The engine, with each repetition, provides a subscript into the array to use a pointer in the array to call the function.

When dealing with classes, a pointer to one member function cannot be assigned to the pointer of another member function where the pointers have different signatures or belong to different classes. As a result, there is a need in C++ and other object-oriented programming environments for a universal pointer capable of pointing to functions having any type and belonging to any class. The present invention addresses this as well as other needs.

SUMMARY OF THE INVENTION

To overcome the limitations in the prior art described above, and to overcome other limitations that will become apparent upon reading and understanding the present specification, the present invention discloses a method, apparatus, and article of manufacture for creating a universal pointer object having a first data member holding a pointer to a member function. In accordance with the present invention, program developers can call member functions having any type and belonging to any class by using the universal pointer object.

To create and initialize the universal pointer object, a universal pointer object is first created in a memory of a computer. The member function is then stored in the first data member of the universal pointer object using the constructor function of the universal pointer class, wherein the member function pointer is stored in the first data member according to the type of the member function. To invoke the member function, the first data member is referenced through a member function of the universal pointer object.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

HARDWARE ENVIRONMENT

Figure 1:
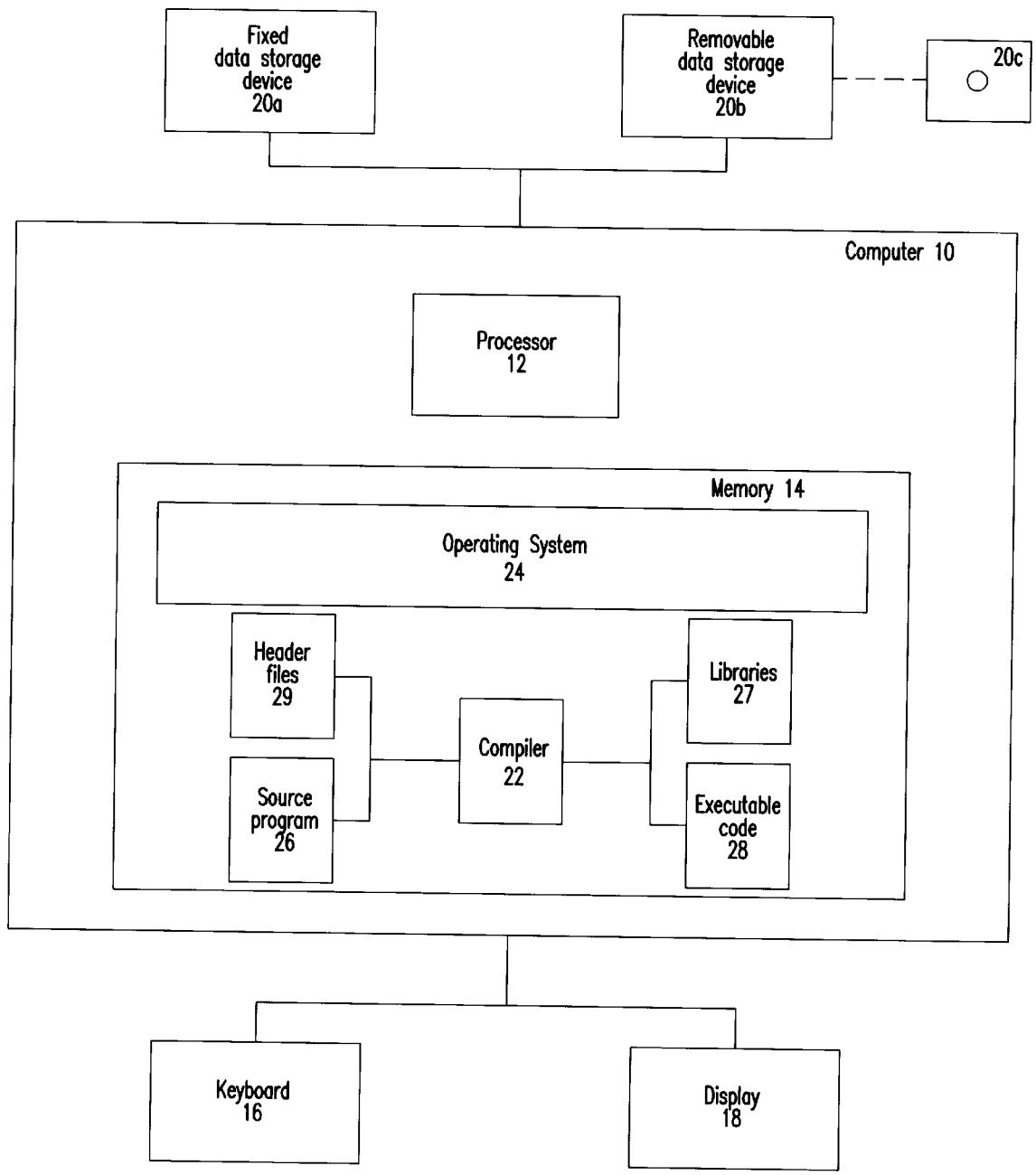
FIG. 1 is a block diagram illustrating an exemplary hardware environment used to implement the preferred embodiment of the invention.

FIG. 1 is a block diagram illustrating an exemplary hardware environment used to implement the preferred embodiment of the invention. In the exemplary hardware environment, a computer 10 may include, inter alia, a processor 12, memory 14, keyboard 16, display 18, as well as fixed and/or removable data storage devices and their associated media 20a, 20b, and 20c. Those skilled in the art will recognize that any combination of the above components, or any number of different components, peripherals, and other devices, may be used with the computer 10.

The present invention is generally implemented using a preprocessor program, a compiler program, and a linker program, each of which executes under the control of an operating system 24, such as OS/2, Windows, AIX, UNIX, DOS, etc. For purposes of simplification, the preprocessor program, compiler program, and linker program will be collectively referred to herein as a compiler 22. In the preferred embodiment, the compiler 22 conforms to ANSI C++ language conventions, although those skilled in the art will recognize that the compiler 22 could also conform to other language conventions without departing from the scope of the present invention.

The compiler 22 receives a source program or main file 26 containing source language statements, and then synthesizes an executable program 28 based on the source language statements in the source program 26. In creating the executable program 28, the compiler 22 preprocessor program first follows preprocessor directives to, for example, include other programs such as a header file 29. The compiler 22 compiler program then compiles the source program 26 along with included files to generate an object code. The compiler 22 linker program then links the object code to other object code, for example, standard libraries 27, to produce the executable program 28.

Generally, the compiler 22, operating system 24, source program 26, executable program 28, header file 29, and standard libraries 27 are all tangibly embodied in a computer-readable medium, e.g., one or more of the fixed and/or removable data storage devices and their associated media 20a–c. Moreover, the compiler 22, operating system 24, source program 26, executable program 28, header file 29, and standard libraries 27, are all comprised of instructions which, when read and executed by the computer 10, causes the computer 10 to perform the steps necessary to implement and/or use the present invention. Under control of the operating system 24, the executable program 28 may be loaded from the data storage device 20a–c into the memory 14 of the computer 10 for use during actual operations.

Those skilled in the art will recognize many modifications may be made to this configuration without departing from the scope of the present invention.

COMPILATION

The present invention is implemented through the use of a source program or main file 26 that uses a universal pointer class. The main file includes, e.g., by a #include directive, a header file that contains the universal pointer class declaration and is linked to a standard library 27 that contains the member functions of the universal pointer class. The main file 26 is compiled by the compiler 22. As will be discussed more fully below, the main file 26 includes objects of classes which have member functions of different types, for example, static, nonstatic, or virtual. The main file 26 uses the universal pointer class to call these member functions through a universal pointer object or an array of universal pointer objects. To avoid confusion between member functions to be called through a universal pointer object and member functions of the universal pointer object, the former will be hereinafter referred to as member functions.

Figure 2:
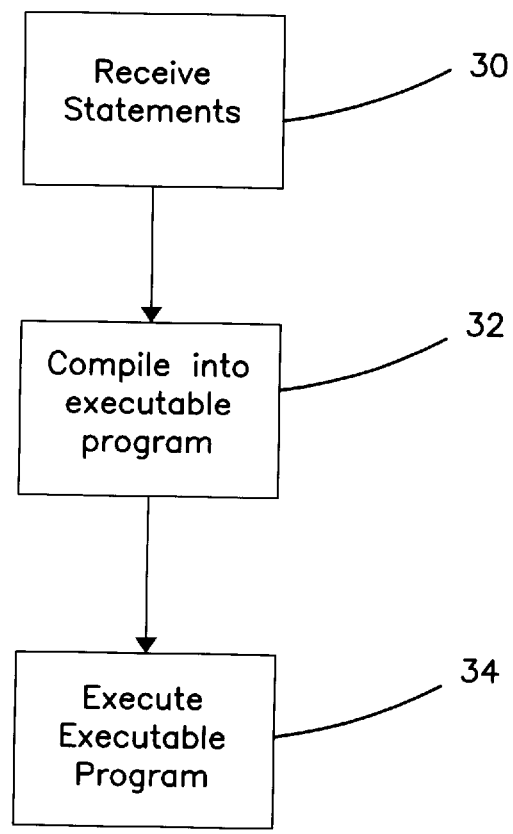
FIG. 2 is a flowchart illustrating the general logic performed during the compilation process to accomplish the present invention.

FIG. 2 is a flowchart illustrating the general flow performed for the compilation and the execution of a program to accomplish the present invention. Block 30 represents the compiler 22 receiving source language statements comprising a main file 26 into the memory 14 of the computer 10. According to the invention, at least one of the received statements comprises a declaration of a universal pointer object, wherein the declaration includes a first argument representing the type of a member function and a second argument representing a pointer to a member function.

In addition, at least one of the received statements comprises a call to a member function of the universal pointer object for invoking the member function (hereinafter invoke member function). The call statement includes a first argument representing the address of the object of the member function. The type of the first argument of the call is cast to the type of the class of the universal pointer object.

Block 32 represents the compiler 22 translating the main file 26 into an executable program 28 in the memory 14 of the computer 10. Compilation results in an executable program 28 having instructions for creating the universal pointer object and initializing a data member of the universal pointer object with the pointer to the member function according to the type of the member function.

The executable program 28 further includes instructions for invoking the member function by referencing the universal pointer data member according to the type of the member function. The executable program 28 also includes instructions for invoking the member function using the member function object address if the member function is nonstatic. Block 34 represents the object program 28 being executed in the memory 14 of the computer 10.

EXECUTION

Figure 3:
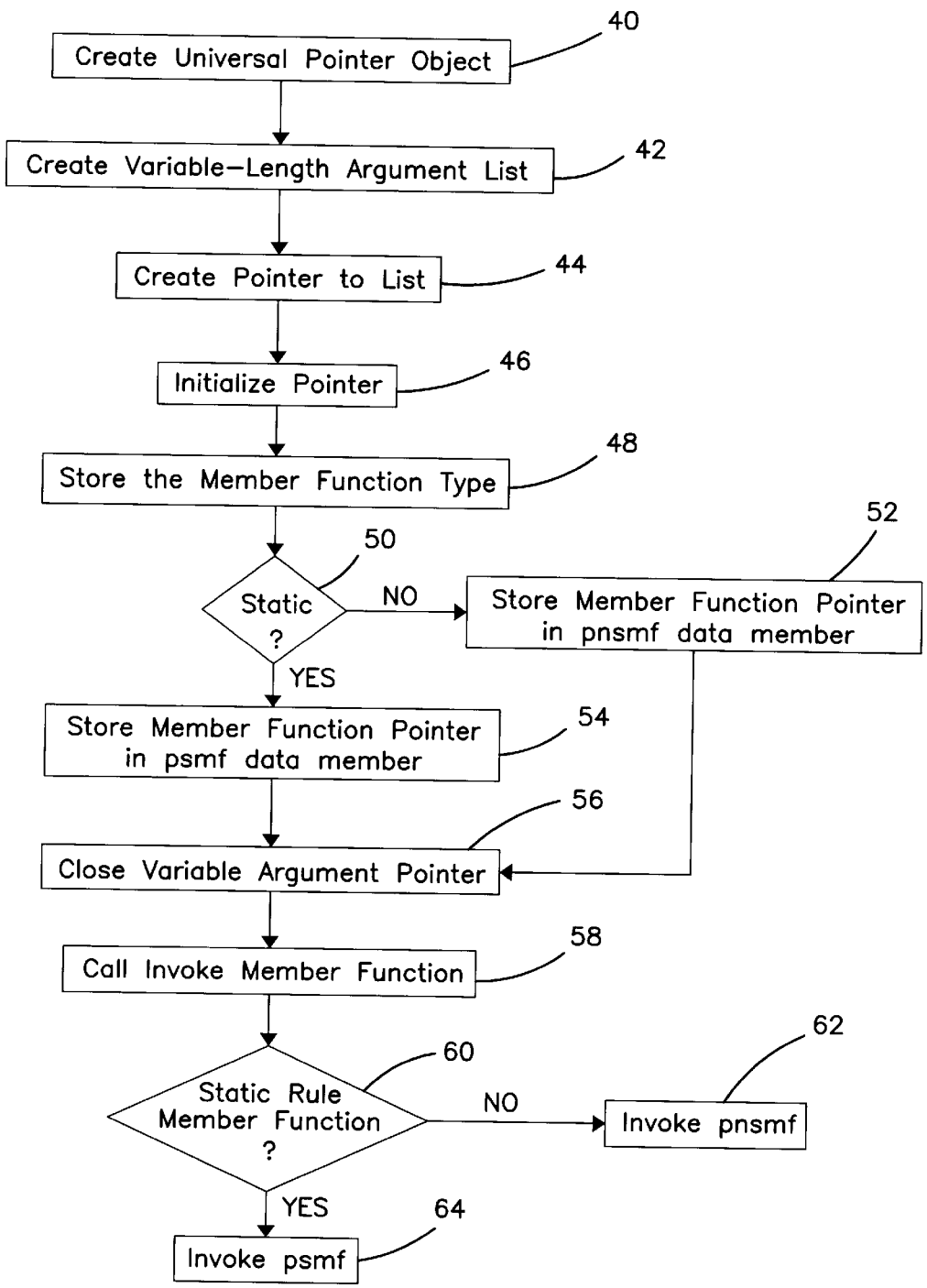
FIG. 3 is a flowchart that illustrates the logic performed by the executable program according to the present invention.

FIG. 3 is a flowchart that illustrates the logic performed by the executable program 28 for creating and initializing a universal pointer object and for invoking a member function through the universal pointer object. Block 40 represents the creation of a universal pointer object in the memory 14 of the computer 10. This involves reserving space in the memory 14 for the data members and member functions of the universal pointer object. The constructor function of the universal pointer object class is automatically invoked when a universal pointer object is created.

The constructor function causes the computer 10 to perform the steps of blocks 42–56. Block 42 represents the creation of a variable-length argument list in the memory 14 of the computer 10. As is well known, a variable argument list includes fixed arguments which are type-checked by the compiler 22 and variable arguments which are not type-checked. According to the invention, the list includes two arguments: one fixed argument representing the type of a member function (hereinafter rule member type argument) and one variable argument representing the pointer to the member function (hereinafter rule member pointer argument). It is noted that the list may include any number of arguments, provided that the member function type is a fixed argument and the member function pointer is a variable argument.

Following block 42, blocks 44 and 46 respectively represent the creation of a pointer to the list (hereinafter list pointer) in the memory 14 of the computer 10 and the initialization of the list pointer. Initialization of the list pointer includes the step of retrieving the member function type argument from the variable-length argument list.

Next, the member function type argument is stored in a data member (hereinafter member function type data member), as indicated at block 48. The member function type data member is used for initializing the universal pointer object as well as invoking the member function, as will be discussed hereinbelow.

The computer 10 then stores the member function pointer argument in a data member (hereinafter universal pointer data member) according to the member function type data member. To retrieve the member function argument from the list and store it in the universal pointer data member, the computer 10 first determines whether the member function type argument is static as indicated by decision diamond 50.

If the member function type argument is static, the member function pointer argument is retrieved from the variable argument list and stored in a static universal pointer data member as indicated by block 54. Otherwise, the member function pointer is retrieved from list and stored in a nonstatic universal pointer data member as indicated by block 52.

The computer 10 then closes the list pointer, as indicated at block 56. This includes freeing up the space in memory 14 that was allocated for the list pointer.

By passing the member function pointer argument as a variable argument of a variable-length argument list, the type and class of the pointer is not checked since the compiler only type-checks fixed arguments. Thus, a number of universal pointer objects can be created and each can hold a rule member pointer of any type and belonging to any class. Moreover, by retrieving the member function type argument prior to the member function pointer argument, the type can be used as a flag to appropriately retrieve and store the member function pointer argument.

Following the creation and initialization of the universal pointer object, the computer 10 may execute the invoke member function of the universal pointer object to invoke the member function by referencing the universal pointer object data member which holds the pointer to the member function. To invoke the member function, the computer 10 first determines whether the type of the member function is static, as indicated by block 52. This step involves checking the member function type data member, stored at block 48, against a static type identifier.

If the member function type is static, the member function is invoked by directly referencing the static universal pointer object data member, as indicated by block 64. Otherwise, the computer 10 uses the address of the object of the member function to reference the nonstatic universal pointer object data member and thereby invoke the member function, as indicated by block 64.

UNIVERSAL POINTER CLASS

Table 1 illustrates the source code of an exemplary universal pointer class. The universal pointer class is declared as __RAny__Class, as indicated at line 59. Following the class declaration, the data members and user-defined types of the universal pointer class are declared between lines 61 and 81. These data members and types are created for each universal pointer object of the universal pointer class.

Specifically, lines 69–74 create a user-defined type __RRmf__Type having identifiers __Rstatic__rmft, __Rvirtual__rmft, and Rnon__s__v__rmft that respectively identify a static member function type, a virtual member function type, and a nonstatic and nonvirtual member function type. A data member rmf__type of user-defined type __RRmf__Type is created at line 81.

Data members pnsmf and psmf of user-defined types __RPnsmf and __Rpsmf, respectively, are created at lines 75–80. Data member psmf is a static universal pointer data member for storing a pointer to a static member function and data member psnmf is a nonstatic universal pointer member function for storing a pointer to nonstatic member function. For each universal pointer object, the pointer to a member function is held by either data member pnsmf or data member psmf, as will be explained hereinbelow.

The constructor function prototype of the universal pointer class, __RAny__Class, is declared at line 82. As indicated by the ellipsis ( . . . ) in the constructor function's prototype, the constructor function, when executed, creates a variable length argument list in the memory 14 of the computer 10.

At lines 84–87, the invoke member function of the universal pointer class is declared. The invoke member function is called to invoke a member function and includes, as its first parameter, a pointer "this" of universal pointer class type to the current object, and, as its second parameter, a parameter declaration.

CONSTRUCTOR FUNCTION

Further details of the invention will now be illustrated with reference to Table 2, which illustrates source code of an exemplary constructor function and an exemplary invoke member function of a universal pointer class.

The constructor function of the universal pointer class __RAny__Class is defined at lines 4–14. As discussed above and as indicated by the ellipsis ( . . . ) in the parameter list at line 4, the constructor function creates a variable-length argument list. According to the invention, only two arguments need to be stored by the list: a fixed argument representing the member function type and a variable argument representing the member function pointer.

As discussed above, by storing the member function pointer argument as a variable argument of a variable-length argument list, the compiler 22 does not check the type and class of the pointer. Moreover, by retrieving the member function type argument prior to the member function pointer argument, the member function type can be used as a flag to correctly retrieve and store the member function pointer.

To use a variable-length argument list, a variable arguments header, stdarg.h, is included when compiling the program, as indicated at line 2. The stdarg.h header contains the type, va__list, and macros, va__start, va__arg, and va__end, necessary for using a variable-length argument list.

Prior to retrieving the arguments from the variable-length argument list into memory, a list pointer ap of type va__list is created in the memory of the computer as indicated by line 6. Pointer ap is used by macros va__start, va__arg, and va__end to retrieve arguments from the variable-length argument list for use by the constructor function. After pointer ap is created, the computer 10 executes macro va__start to initialize the pointer ap, as indicated at line 7. Macro va__start receives two arguments: the pointer ap and the identifier of the rightmost argument in the argument list before the ellipsis, which, in the exemplary embodiment, is the member function type argument rmf__type__. As indicated at line 8, the member function type argument is then stored in member function type data member rmf__type.

Next, the member function pointer argument of the variable argument list is retrieved from the variable argument list and stored according to the member function type argument, as indicated at lines 9–12. To retrieve the member function pointer argument, macro va__arg is invoked, as indicated at lines 10 and 12. Macro va__arg receives two arguments, pointer ap and the type of the value expected in the next argument in the list, and returns the value of the next argument in the list, for example, the member function pointer argument.

In the exemplary embodiment, the next argument of the list is the member function pointer argument. Thus, the second argument of va__arg, i.e., the type of the value expected in the next argument in the list, must match the member function type argument. However, the member function type can vary. Accordingly, the present invention uses the member function type argument as a flag to correctly retrieve and store the member function pointer argument.

The member function type argument is used as a flag as indicated at line 9. Specifically, member function type data member rmf__type, i.e., the variable holding the value of the first argument, is compared to the identifier __Rstatic__rmft, which identifies a static member function type. If the member function type is static, the pointer is retrieved from the variable argument list and stored in data member psmf as indicated by block line 10. Retrieval of a pointer to a static member function involves passing a __Rpsmf argument as the second argument to the macro va__arg. Otherwise, the member function is retrieved from the variable argument list and stored in data member pnsmf as indicated by line 12. Retrieval of a pointer to a nonstatic member function involves passing a __Rpnsmf argument as the second argument to the macro va__arg.

Finally, as indicated at line 13, the constructor function executes macro va__end with pointer ap to close the pointer ap and free the memory occupied thereby.

The exemplary invoke member function is defined at lines 16–24. As will be discussed hereinbelow, the invoke member function stores two arguments in its parameters. An argument representing the address of the object of the member function is stored in its first parameter __RAny__Class *This, and an argument representing the parameter declaration is stored in its second parameter.

The invoke function then invokes the member function by referencing the universal pointer object data member, which holds the pointer to the member function as indicated at lines 21 and 23. To invoke the member function, the invoke function first determines whether the type of the member function is static, as indicated at line 20. This involves comparing member function type data member rmf_type against the static-type identifier _Rstatic_rmft.

If the member function type is static, the member function is invoked by directly referencing the universal pointer object data member psmf, as indicated by lines 20–21. Otherwise, the invoke member function references the current object pointer "this" to invoke the universal pointer object data member psnmf and thereby invoke the member function, as indicated by block lines 22–23.

MAIN FILE

Further details of the invention will be described with reference to Table 3, which illustrates the source code of an exemplary main file. The main file includes a number of classes as indicated at lines 8–24, an array pmfs[ ] of universal pointer objects, i.e., _RAny_Class objects, as indicated at lines 33–41, and an engine for calling the member functions of the classes, as indicated at lines 46–51.

The two classes include class A, which has three member functions f1, f2, and f3, and class B, which also has three member functions g1, g2, and g3. To illustrate the universal nature of the universal pointer object, the member functions include static, nonstatic, and virtual types. It is noted that classes A and B need not be declared in the main file. Indeed, such classes would typically be declared in a header file which is included in the main file. Moreover, two classes are provided by way of example, not of limitation. Any number of classes may be used. An instance of each class is created at lines 43–44.

Array pmfs[ ] contains six universal pointer objects declarations as indicated at lines 35–40. For each declaration, a universal pointer object is created and its constructor function is called to initialize its data members. In doing so, the variable-length argument list is created and initialized with the arguments according to the declaration. That is, the first argument of the list is initialized with the type of a member function and the second argument is initialized with a pointer to the address of the member function.

For each object, the constructor function retrieves the member function type and the pointer to the member function and stores the pointer in either the pnsmf or psmf data member, as discussed above. In this manner, each universal pointer object of lines 35–40 holds a pointer to a member function of class A or class B. For example, the universal pointer object created at line 35 holds the pointer to member function f1 of class A.

Following creation of the universal pointer objects, the member functions are invoked using the exemplary engine illustrated at lines 46–51. At line 46, a integer variable size is initialized to set the threshold for the number of loops by the engine. The engine then performs size loops for each class and, with each loop, it invokes a member function of the requisite class by referencing the universal pointer object for the member function, as indicated by lines 48–49 and 50–51.

Specifically, the invocation of a member function includes passing two arguments to the invoke member function, the first argument being the address of the object of the member function and the second argument being the value "a", as indicated by lines 49 and 51.

Since universal pointer class objects may hold pointers to member functions of different types and classes, the present invention casts the type of the address of the object of the member function to a universal pointer class type, as indicated by lines 49 and 51. This ensures that the argument type passed to the invoke function member matches the type expected by the invoke function member regardless of the type or class of the member function.

The invoke member function then invokes the member function by referencing the universal pointer object data member which holds the pointer to the member function.

CONCLUSION

This concludes the description of the preferred embodiment of the invention. The following describes some alternative embodiments for accomplishing the present invention. The present invention may be implemented in any type of computer, such as a mainframe, minicomputer, or personal computer. Moreover, the present invention is not limited to the C++ programming language but extends to cover other object oriented languages having similar problems with pointers.

In summary, the present invention discloses a method, apparatus, and article of manufacture for creating a universal pointer object having a first data member holding a pointer to a member function. In accordance with the present invention, program developers can call member functions having any type and belonging to any class by using the universal pointer object.

To create and initialize the universal pointer object, a universal pointer object is first created in a memory of a computer. The member function is then stored in the first data member of the universal pointer object using the constructor function of the universal pointer class, wherein the member function pointer is stored in the first data member according to the type of the member function. To invoke the member function, the first data member is referenced through a member function of the universal pointer object.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE 1

```
55  // rranycls.h
56  #ifndef rranycls_h
57  #define rranycls_h
58  // A universal pointer ciass
59  class _RAny_Class
60  {
61      virtual /* put the return type here */
62          *dummy(/* put the parameter declaration here */);
63      typedef /* put the return type here */
64          *(_RAny_Class::* _Rpnsmf)
65          (/* put the parameter declaration here */);
66      typedef /* put the return type here */
67          *(*_Rpsmf)
68          (/* put the parameter declaration here */);
69  typedef enum
70  {
71      _Rstatic_rmft, // static rule member function (RMF)
72      _Rvirtual_rmft, // virtual RMF
73      _Rnon_s_v_rmft // non-static and non-virtual RMF
74  }_RRmf_Type;
75  union
```

TABLE 1-continued

```
76  {
77      __RPnsmf pnsmf;      // Pointer to a Non-Static Member
78                           // Function
79      __Rpsmf psmf;        // Pointer to a Static Member Function
80  };
81  __RRmf__Type rmf__type; // type of the function
82  __RAny__Class(__RRmf__Type rmf__type__, . . .);
83
84
85  /* put the return type here */
86  invoke
87  (__RAny__Class *This, /* put the parameter declaration here */);
88  };
89
90  #endif
```

TABLE 2

```
1   // rranycls.cpp
2   #include "rranycls.h"
3   #include <stdarg.h>
4   __RAny__Class::__RAny__Class(__RRmf__Type rmf__type__, . . .)
5   {
6       va__list ap;
7       va__start(ap, rmf__type__);
8       rmf__type = rmf__type__;
9       if (rmf__type == Rstatic__rmft)
10          psmf = va__arg(ap, __Rpsmf);
11      else
12          pnsmf = va__arg(ap, __Rpnsmf);
13      va__end(ap);
14  }
15
16  /* put the return type here */
17  __RAny__Class:: invoke
18  (__RAny__Class *This, /* put the parameter declaration here */)
19  {
20      if (rmf__type == __Rstatic__rmft)
21          return rmfsv.psmf(/* put the arguments here */);
22      else
23          return (This->*rmfsv.pnsmf) (/* put the arguments here 24 */);
25  }
```

TABLE 3

```
1   //===START OF SPECIFICATIONS =============
2   //
3   // MODULE-NAME: main.cpp
4   //
5   // Compile with rranycls.cpp
6   //
7   #include "rranycls.h"
8   class A
9   {
10      '1// . . .
11  public:
12      virtual int f1(char c);
13      int f2(char c);
14      static int f3(char c);
15  }
16  //
17  class B
18  {
19      // . . .
20  public:
21      virtual int g1(char c);
22      int g2(char c);
23      static int g3(char c);
24  }
25  //
26  // Change the /* put the return type here */ in RAny__Class 27 //
        to the return type 'int' and change the /* put the
28  // parameter declaration here */ in __RAny__Class to the
29  // parameter type 'char'. Now you can have an array of
```

TABLE 3-continued

```
30  // __RAny__Class objects which will hold the pointers to
31  // member functions of class A and /or class B.
32  //
33  __RAny__Class pmfs[] =
34  {
35      __RAny__Class(__Rvirtual__rmft, &A::f1),
36      RAny__Class(__Rnon__s__v__rmft, &A::f2),
37      RAny__Class(__Rstatic__rmft, &A::f3),
38      RAny__Class(__Rvirtual__raft, &B::g1),
39      RAny__Class(__Rnon__s__v__rmft, &B::g2)
40      RAny__Class(__Rstatic__rmft, &B::g3),
41  }
42  //
43  A a;
44  B b;
45  //
46  int size = sizeof(pmfs)/sizeof(__RAny__Class)/2;
47  //
48  for (int i = 0; i < size; i++)
49      pmfs(i). invoke((__RAny__Class *) &a, 'a');
50  for (i =0; i < size; (++)
51      pmfs(i). invoke ((__RAny__Class *) &b, 'b');
52  //
53  //===END OF SPECIFICATIONS =============
```

What is claimed is:

1. A method of creating a universal pointer object having a first data member holding a pointer to a member function, comprising the steps of:
    (a) creating a universal pointer object in a memory of a computer; and
    (b) storing the member function pointer in the first data member of the universal pointer object using the constructor function of the universal pointer class, wherein the member function pointer is stored in the first data member according to the type of the member function.

2. The method of claim 1, wherein the type of the member function is static.

3. The method of claim 1, wherein the type of the member function is nonstatic.

4. The method of claim 1, further comprising the step of creating a variable-length argument list in the memory of the computer, wherein the list includes a first argument representing the member function type and a second argument representing the member function pointer.

5. The method of claim 4, further comprising the steps of:
    creating a pointer to the variable-length argument list in the memory of the computer;
    storing the second argument in the list pointer;
    storing the list pointer in the first data member of the universal pointer object according to first argument; and
    closing the list pointer.

6. The method of claim 5, further comprising the step of initializing the list pointer using the first argument.

7. The method of claim 5, further comprising the step of storing the first argument in a second data member of the universal pointer object, wherein the list pointer is stored in the first data member according to the second data member.

8. The method of claim 7, further comprising the step of invoking the member function by referencing the first data member according to the second data member.

9. The method of claim 1, further comprising the step of invoking the member function by referencing the first data member.

10. The method of claim 9, wherein when the member function is nonstatic, the first data member is referenced using the address of the object of the member function.

11. An apparatus for creating a universal pointer object having a first data member holding a pointer to a member function, comprising:

(a) a computer having a memory;

(b) means, performed by the computer, for creating a universal pointer object in a memory of a computer; and (c) means, performed by the computer, for storing the member function pointer in the first data member of the universal pointer object using the constructor function of the universal pointer class, wherein the member function pointer is stored in the first data member according to the type of the member function.

12. The apparatus of claim 11, wherein the type of the member function is static.

13. The apparatus of claim 11, wherein the type of the member function is nonstatic.

14. The apparatus of claim 11, further comprising means, performed by the computer, for creating a variable-length argument list in the memory of the computer, wherein the list includes a first argument representing the member function type and a second argument representing the member function pointer.

15. The apparatus of claim 14, further comprising:

means, performed by the computer, for creating a pointer to the variable-length argument list in the memory of the computer;

means, performed by the computer, for storing the second argument in the list pointer;

means, performed by the computer, for storing the list pointer in the first data member of the universal pointer object according to first argument; and means, performed by the computer, for closing the list pointer.

16. The apparatus of claim 15, further comprising means, performed by the computer, for initializing the list pointer using the first argument.

17. The apparatus of claim 15, further comprising means, performed by the computer, for storing the first argument in a second data member of the universal pointer object, wherein the list pointer is stored in the first data member according to the second data member.

18. The apparatus of claim 17, further comprising means, performed by the computer, for invoking the member function by referencing the first data member according to the second data member.

19. The apparatus of claim 11, further comprising means, performed by the computer, for invoking the member function by referencing the first data member.

20. The apparatus of claim 19, wherein when the member function is nonstatic, the first data member is referenced using the address of the object of the member function.

21. A program storage medium, readable by a computer, tangibly embodying one or more computer programs executable by the computer to perform method steps for creating a universal pointer object having a first data member holding a pointer to a member function, the method comprising the steps of:

(a) creating a universal pointer object in a memory of the computer; and (b) storing the member function pointer in the first data member of the universal pointer object using the constructor function of the universal pointer class, wherein the member function pointer is stored in the first data member according to the type of the member function.

22. The program storage medium of claim 21, wherein the type of the member function is static.

23. The program storage medium of claim 21, wherein the type of the member function is nonstatic.

24. The program storage medium of claim 21, wherein the method further comprises the step of creating a variable-length argument list in the memory of the computer, wherein the list includes a first argument representing the member function type and a second argument representing the member function pointer.

25. The program storage medium of claim 24, wherein the method further comprises the steps of:

creating a pointer to the variable-length argument list in the memory of the computer;

storing the second argument in the list pointer;

then storing the list pointer in the first data member of the universal pointer object according to first argument; and closing the list pointer.

26. The program storage medium of claim 25, wherein the method further comprises the step of initializing the list pointer using the first argument.

27. The program storage medium of claim 26, wherein the method further comprises the step of storing the first argument in a second data member of the universal pointer object, wherein the list pointer is stored in the first data member according to the second data member.

28. The program storage medium of claim 27, wherein the method further comprises the step of invoking the member function by referencing the first data member according to the second data member.

29. The program storage medium of claim 21, wherein the method further comprises the step of invoking the member function by referencing the first data member.

30. The program storage medium of claim 29, wherein when the member function is nonstatic, the first data member is referenced using the address of the object of the member function.

* * * * *

UNITED STATES PATENT AND TRADEMARK OFFICE
Certificate

Patent No. 5,805,887

Patented: September 8, 1998

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: I-Shin Andy Wang, San Jose, CA and Jy-Jine James Lin, Cupertino, CA.

Signed and Sealed this Thirtieth Day of October 2001.

KEVIN TESKA
*Supervisory Patent Examiner*
Art Unit 2123